United States Patent
Lee

(10) Patent No.: US 11,161,035 B2
(45) Date of Patent: *Nov. 2, 2021

(54) BUTTON ASSEMBLY AND CONTROLLER INCLUDING THE SAME

(71) Applicant: Cheng Uei Precision Industry Co., Ltd., New Taipei (TW)

(72) Inventor: Tsung-Shih Lee, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 125 days.

This patent is subject to a terminal disclaimer.

(21) Appl. No.: 16/660,795

(22) Filed: Oct. 22, 2019

(65) Prior Publication Data

US 2020/0206606 A1 Jul. 2, 2020

(30) Foreign Application Priority Data

Dec. 26, 2018 (CN) .......................... 201822205512.8

(51) Int. Cl.
| | |
|---|---|
| *A63F 13/218* | (2014.01) |
| *H01H 13/52* | (2006.01) |
| *H01H 13/10* | (2006.01) |
| *A63F 13/24* | (2014.01) |
| *H01H 13/04* | (2006.01) |

(52) U.S. Cl.
CPC ............ *A63F 13/218* (2014.09); *A63F 13/24* (2014.09); *H01H 13/04* (2013.01); *H01H 13/10* (2013.01); *H01H 13/52* (2013.01); *A63F 2300/1043* (2013.01); *A63F 2300/1056* (2013.01); *H01H 2231/008* (2013.01)

(58) Field of Classification Search
CPC ................... A63F 13/218; A63F 13/24; A63F 2300/1043; A63F 2300/1056; H01H 13/04; H01H 13/10; H01H 13/52; H01H 2231/008

See application file for complete search history.

(56) References Cited

U.S. PATENT DOCUMENTS

| | | | | |
|---|---|---|---|---|
| 4,528,428 | A | * | 7/1985 | Gotoh .................... H01H 13/84 200/5 A |
| 5,936,554 | A | * | 8/1999 | Stanek .................. G06F 3/0219 341/22 |
| 2018/0166231 | A1 | * | 6/2018 | Wu ...................... H01H 13/705 |

* cited by examiner

*Primary Examiner* — Werner G Garner
(74) *Attorney, Agent, or Firm* — Cheng-Ju Chiang

(57) ABSTRACT

A button assembly adapted for being mounted in a controller includes a pedestal, a pressure sensor module and a key cap. A middle of the pedestal has an accommodating groove penetrating upward through a top surface of the middle of the pedestal. Two opposite sides of the pedestal have two limiting portions oppositely protruded outward. The pressure sensor module is mounted in the accommodating groove of the pedestal. The key cap is covered on the pressure sensor module. A bottom surface of the key cap has a contact portion contacting with the pressure sensor module. Two opposite sides of the key cap have an active portion and a fixing portion protruded outward. The active portion and the fixing portion are mounted to the two limiting portions, respectively. In processes of pressing and releasing the key cap, the active portion move downward and upward with respect to the one limiting portion.

15 Claims, 6 Drawing Sheets

BUTTON ASSEMBLY AND CONTROLLER INCLUDING THE SAME

CROSS-REFERENCE TO RELATED APPLICATION

The present application is based on, and claims priority from, China Patent Application No. 201822205512.8, filed Dec. 26, 2018, the disclosure of which is hereby incorporated by reference herein in its entirety.

BACKGROUND OF THE INVENTION

1. Field of the Invention

The present invention generally relates to a button assembly, and more particularly to a modular button assembly, and a controller including the button assembly.

2. The Related Art

Currently, a conventional controller includes a top cover, a button assembly and a pressure sensor. The pressure sensor realizes a pressure sensing function by virtue of a pressure sensing element or charges of a flexible printed circuit board. When a force exerted by a finger on the pressure sensor is larger, a pressed area of the pressure sensor is larger, the flexible printed circuit board will sense pressure signals and convert the pressure signals into digital signals, and then the digital signals are converted into pressure force values. When the conventional game controller is assembled, the top cover is covered to the button assembly, and the pressure sensor is assembled under the top cover. When a user uses the conventional game controller, the user will press the button assembly, the button assembly will be pressed downward to contact with a top surface of the pressure sensor in advance and then the pressure sensor is further pressed downward for completing pressing the button assembly.

However, in order to introduce the pressure sensor which is made of a soft foam material, the pressure sensor which is made of the soft foam material has a stronger sensing sensitivity. Therefore, in the above-mentioned configuration of the conventional game controller, when the button assembly is pressed, the conventional game controller is easily affected by accumulated tolerances among structures of the conventional game controller to cause values to be overly changed. Moreover, if the button assembly is broken, the broken button assembly is hardly distinguished to be caused by the pressure sensor or other structures and the broken button assembly is difficult to be changed.

Thus, it is necessary to provide an innovative modular button assembly, and an innovative game controller including the innovative button assembly, the innovative button assembly includes a pressure sensor which is made of the soft foam material, so that when the pressure sensor which is made of the soft foam material is in use, the innovative button assembly can have less accumulated tolerances, and the innovative button assembly can be easily detected and replaced in the innovative game controller.

SUMMARY OF THE INVENTION

An object of the present invention is to provide a button assembly adapted for being mounted in a controller. The button assembly includes a pedestal, a pressure sensor module and a key cap. A middle of the pedestal has an accommodating groove penetrating upward through a top surface of the middle of the pedestal. Two opposite sides of the pedestal have two limiting portions oppositely protruded outward. The pressure sensor module is mounted in the accommodating groove of the pedestal. The key cap is covered on the pressure sensor module. A bottom surface of the key cap has a contact portion contacting with the pressure sensor module. Two opposite sides of the key cap have an active portion and a fixing portion protruded outward. The active portion and the fixing portion are mounted to the two limiting portions, respectively. In processes of press and release the key cap, the active portion move downward and upward with respect to the one limiting portion.

Another object of the present invention is to provide a controller, includes a button assembly, including a pedestal, a middle of the pedestal has an accommodating groove penetrating upward through a top surface of the middle of the pedestal, two opposite sides of the pedestal have two limiting portions oppositely protruded outward, a pressure sensor module mounted in the accommodating groove of the pedestal, and a key cap covered on the pressure sensor module, a bottom surface of the key cap has a contact portion contacting with the pressure sensor module, two opposite sides of the key cap have an active portion and a fixing portion protruded outward, the active portion and the fixing portion are mounted to the two limiting portions, respectively, in processes of pressing and release the key cap, the two active portion moving downward and upward to one limiting portion; a casing mounted under the button assembly; a fastening frame mounted in the casing; circuit board mounted under the fastening frame and the button assembly and is mounted in the casing; an outer shell, the casing, the circuit board and the fastening frame together with the button assembly are disposed in the outer shell; and a top cover covered on the outer shell, and the top cover covers the button assembly, the casing the circuit board and the fastening frame, a middle of the top cover opens an opening vertically penetrating through the top cover, the key cap is exposed outside from the opening.

Another object of the present invention is to provide a button assembly adapted for mounted in a controller, includes a pedestal, two opposite sides of the pedestal have two limiting portions oppositely protruded outward; a pressure sensor module mounted in the pedestal, a top of the pressure sensor module has a soft material sensor, the soft material sensor has an elasticity; and a key cap covered on the pressure sensor module, a bottom surface of the key cap has a contact portion contacting with the pressure sensor module, two opposite sides of the key cap have an active portion and a fixing portion protruded outward, the active portion and the fixing portion are mounted to the two limiting portions, respectively, in processes of press and release the key cap, the active portions move downward and upward to the one limiting portion.

As described above, the button assembly is capable of being pressed by virtue of the two limiting portions and the active portion and fixing portion being disposed among the pedestal, the pressure sensor module and the key cap, and furthermore, the pressure sensor module and the key cap of the button assembly are assembled to form the combination module, the combination module is mounted on the pedestal, so that the button assembly reaches a modular requirement, the button assembly applied in the controller may be easily detected and changed in the other structures of which each is matched with the combination module. In addition, when the user presses the modular button assembly, a pressing force is transmitted to the pressure sensor module through the key cap, comparing the modular button assembly with a button assembly of the conventional controller, the modular button assembly has fewer accumulated tolerances and a higher sensing sensitivity in use.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
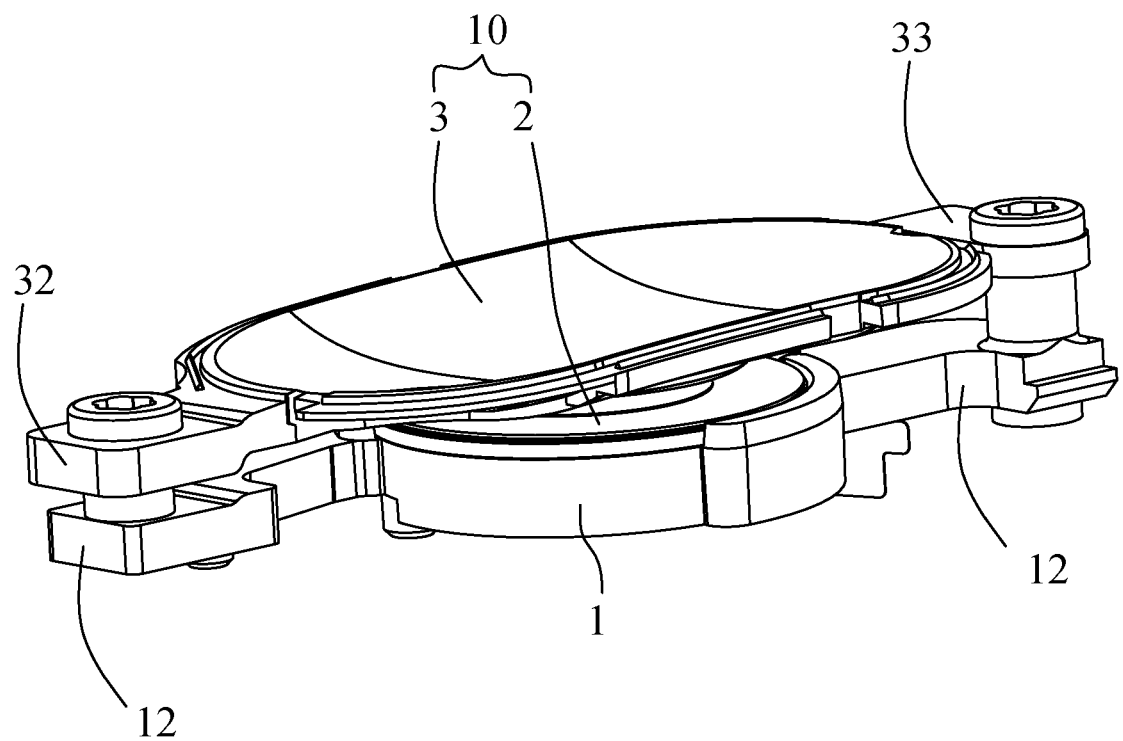
FIG. 1 is a perspective view of a button assembly in accordance with the present invention.
Figure 2:
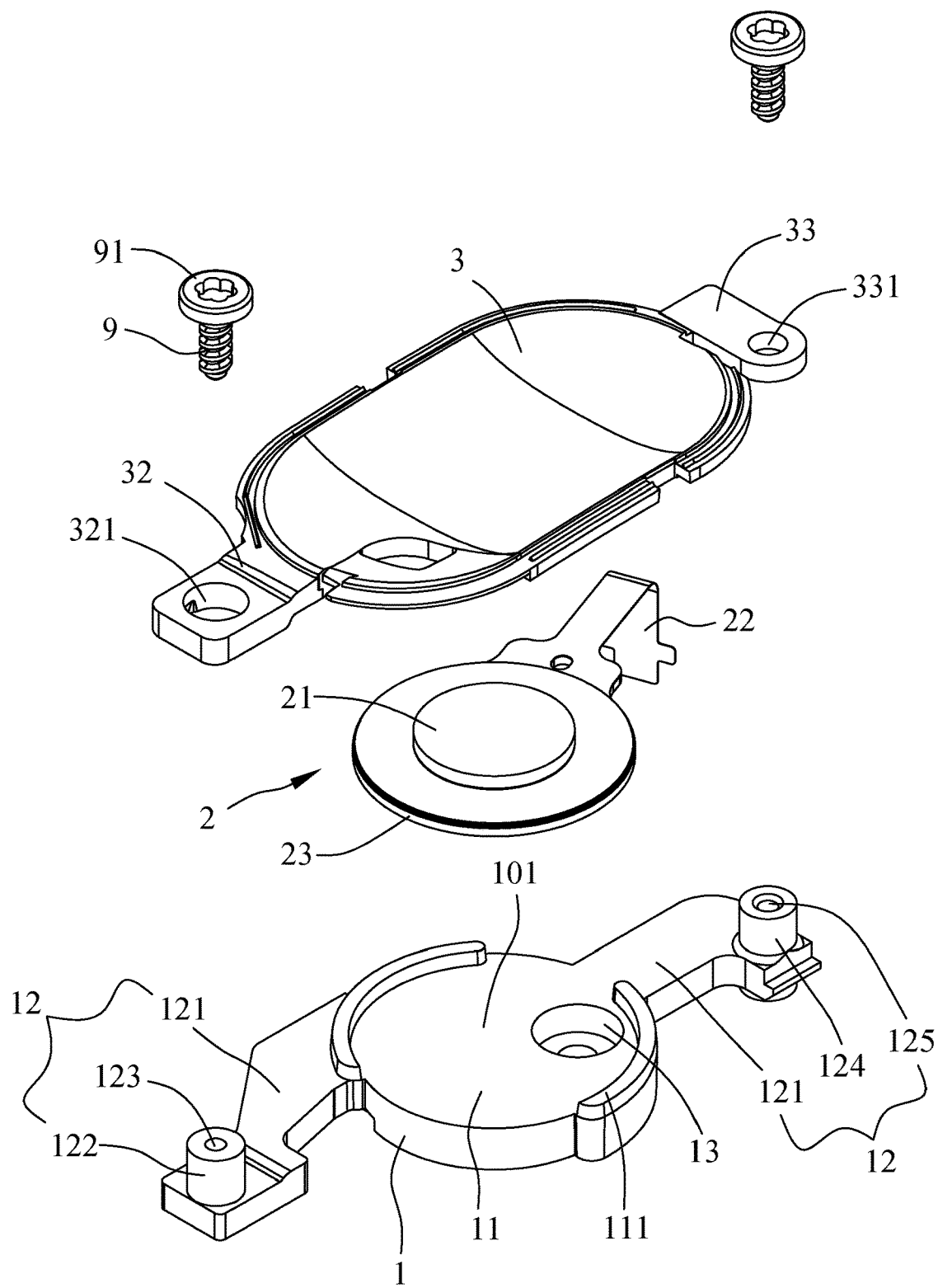
FIG. 2 is an exploded perspective view of the button assembly in accordance with the present invention.
Figure 3:
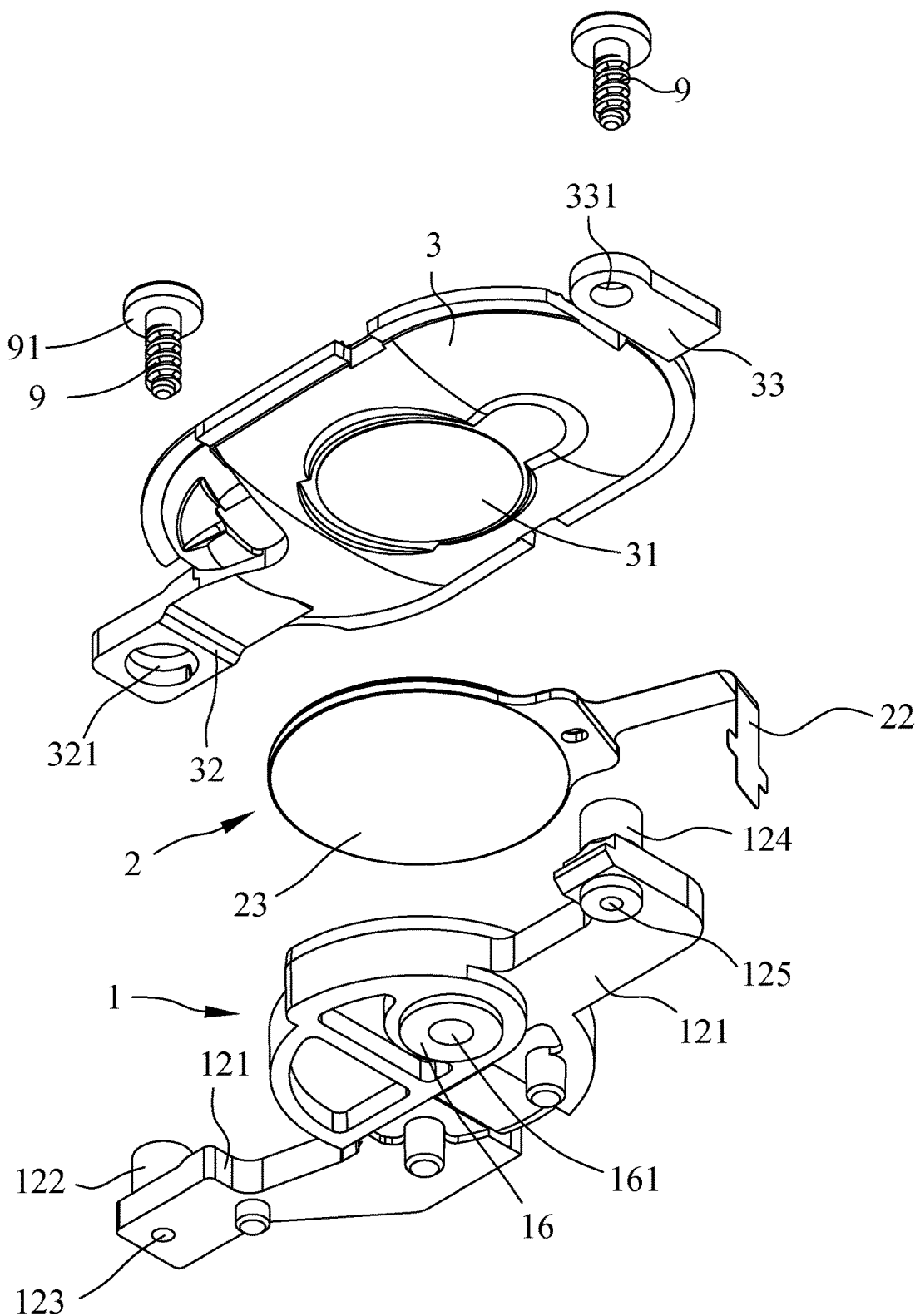
FIG. 3 is another exploded perspective view of the button assembly of the FIG. 2.

With reference to FIG. 1 to FIG. 3, a button assembly 100 and a controller 200 in accordance with a preferred embodiment of the present invention are shown. The controller 200 includes the button assembly 100. The button assembly 100 adapted for being mounted in the game controller 200, includes a pedestal 1, a pressure sensor module 2 and a key cap 3.

The pedestal 1 has a circular base portion 101. A peripheral surface of the base portion 101 of the pedestal 1 has a plurality of arc-shaped limiting blocks 111, so that a middle of the pedestal 1 has an accommodating groove 11 penetrating upward through a top surface of the middle of the pedestal 1 and the accommodating groove 11 is surrounded by the plurality of the limiting blocks 111. In the preferred embodiment, two opposite sides of the peripheral surface of the base portion 101 protrude outward and then extend upward to form two arc-shaped limiting blocks 111, so that the middle of the pedestal 1 has the accommodating groove 11 penetrating upward through the top surface of the middle of the pedestal 1 and surrounded by the two limiting blocks 111.

Two opposite sides of the pedestal 1 have two limiting portions 12 oppositely protruded outward. The two opposite sides of the peripheral surface of the base portion 101 extend oppositely outward to form the two limiting portions 12 connected with two opposite sides of two outer surfaces of the two limiting blocks 111 away from each other, respectively. Each limiting portion 12 has a lower extending portion 121 extending outward from one side of the base portion 101. Tail ends of the lower extending portions 121 of the one limiting portion 12 protrudes upward to from a first protruding block 122. A top surface of the first protruding block 122 is recessed downward to form a first fixing hole 123. Tail ends of the lower extending portions 121 of the other limiting portion 12 protrudes upward to from a second protruding block 124. A top surface of the second protruding block 124 is recessed downward to form a second fixing hole 125. The base portion 101 opens a fastening hole 13 vertically penetrating through the base portion 101. A bottom of the base portion 101 protrudes downward to form a hollow fixing pillar 16. A middle of the fixing pillar 16 opens a fixing hole 161 corresponding to a middle of the fastening hole 13 and communicated with the fastening hole 13.

The pressure sensor 2 is mounted in the accommodating groove 11 of the pedestal 1. A top of the pressure sensor module 2 has a circular soft material sensor 21. The pressure sensor module 2 has a fastening portion 23, and a first capacitor 22 extended outward from one side of the fastening portion 23. The pressure sensor module 2 includes the circular soft material sensor 21 mounted on a middle of a top of the fastening portion 23.

With reference to FIG. 2 and FIG. 3, the key cap 3 is covered on the pressure sensor module 2. A bottom surface of the key cap 3 has a contact portion 31 contacting with the pressure sensor module 2. Two opposite sides of the key cap 3 have an active portion 32 and a fixing portion 33 protruded outward. The key cap 3 has an elliptical main portion 34. A bottom surface of the main portion 34 has the contact portion 31 matched with the soft material sensor 21. The contact portion 31 contacts with a top of the soft material sensor 21. One side of the main portion 34 protrudes outward to form the active portions 32 move downward and upward with respect to the one limiting portion 12, the active portion 32 movably inserted downward into the first protruding block 122. The other side of the main portion 34 protrudes outward to form the fixing portion 33. The fixing portion 33 is fixed to the second protrude block 122.

The active portion 32 opens an active hole 321. The active hole 321 is corresponding to the first fixing hole 123, and is assembled on the first protruding block 122. The fixing portion 33 opens an upper fixing hole 331. The upper fixing hole 331 is corresponding to the second fixing hole 125, and is assembled on the second protruding block 124. Two fixing members 9 respectively passes through the first fixing hole 123 and the second fixing hole 125, which can be connected together the active portion 32 and the fixing portion 33 with the pedestal 1. Top portion of each of the fixing member 9 has a nut 91. The nut 91 on the first fixing hole 123 can abut against the top surface of the active portion 32, so that the active portion 32 is limited between the nut 91 and the limiting portion 12, and the active portion 32 can move downward and upward through the first protruding block 122. Another nut 91 on the second fixing hole 125 abut against the top surface of the fixing portion 33, so that the fixing portion 33 is limited between the another nut 91 and the other limiting portion 12, and the fixing portion 33 can move downward and upward through the second protruding block 124.

Because the button assembly 100 uses the soft material sensor 21, a sensing sensitivity of the pressure sensor module 2 is higher than sensing sensitivities of a flexible printed circuit board and a pressure sensing component. When a user presses the pressure sensor module 2 of the button assembly 100, pressure values are easily caused to be overly changed, so the pressure sensor module 2 of the button assembly 100 in accordance with the present invention is assembled in and between the pedestal 1 and the key cap 3. When the key cap 3 of the button assembly 100 is pressed by the user, the soft material 21 shows a sunken status, the active hole 321 pass through the first protruding block 122 and move downward along the protruding block 122 to make the active portion 32 move downward, so that the user proceeds a downward pressed action on the key cap 3.

Because the soft material sensor 21 has an elasticity, when the user presses a portion of the key cap 3, a part of the soft material sensor 21 corresponding to the portion of the key cap 3 is pressed downward by the key cap 3, at the moment, the part of the soft material sensor 21 corresponding to the portion of the key cap 3 will generate a sunken area on account of the soft material sensor 21 bearing a force exerted by the key cap 3, at the moment, the sunken area of the soft material sensor 21 will generate an upward resilience due to the elasticity of the soft material sensor 21. Specifically, when the user presses a portion of the main portion 33 of the key cap 3, a portion of the soft material sensor 21 corresponding to the portion of the main portion 33 of the key cap 3 is pressed downward by the key cap 3, at the moment, the portion of the soft material sensor 21 corresponding to the portion of the main portion 33 of the key cap 3 will generate the sunken area on account of the soft material sensor 21 bearing the force exerted by the key cap 3, at the moment, the sunken area of the soft material sensor 21 will generate the upward resilience due to the elasticity of the soft material sensor 21.

When the key cap 3 of the button assembly 100 is released, the soft material sensor 21 which shows the sunken status will rebound upward to return to an original status so as to push upward the contact portion 31 and make the active hole 321 of the active portion 32 move upward along the protruding block 122, and then the key cap 3 is returned to an initial status. At the moment, the top surfaces of the active portion 32 abut against the nut 91, for offsetting the upward resilience generated by the soft material sensor 21 to steadily maintain the key cap 3 in the initial status, so a pressed action of the button assembly 100 is completed.

Figure 4:
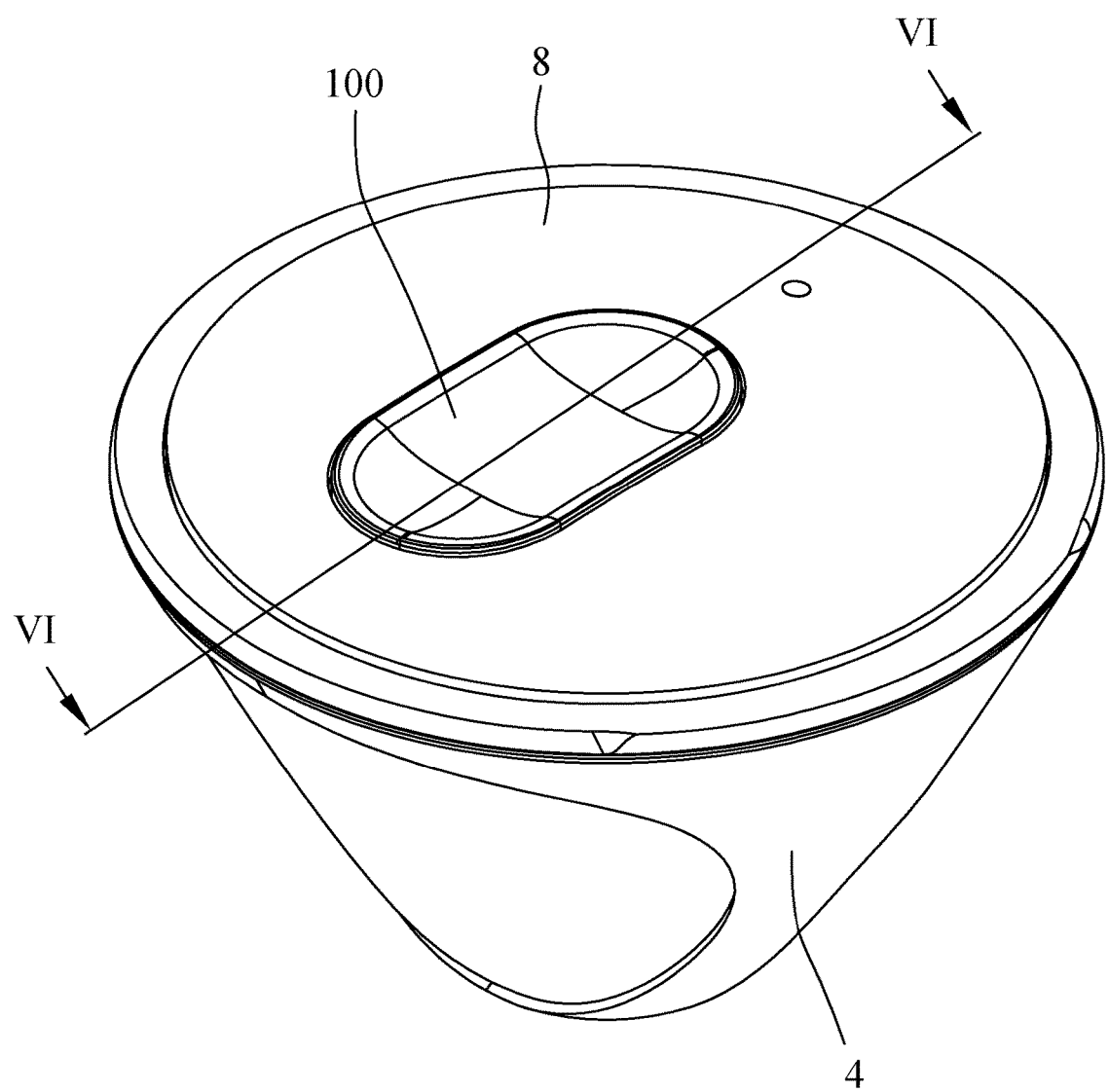
FIG. 4 is a perspective view of a game controller equipped with the button assembly in accordance with the present invention.
Figure 5:
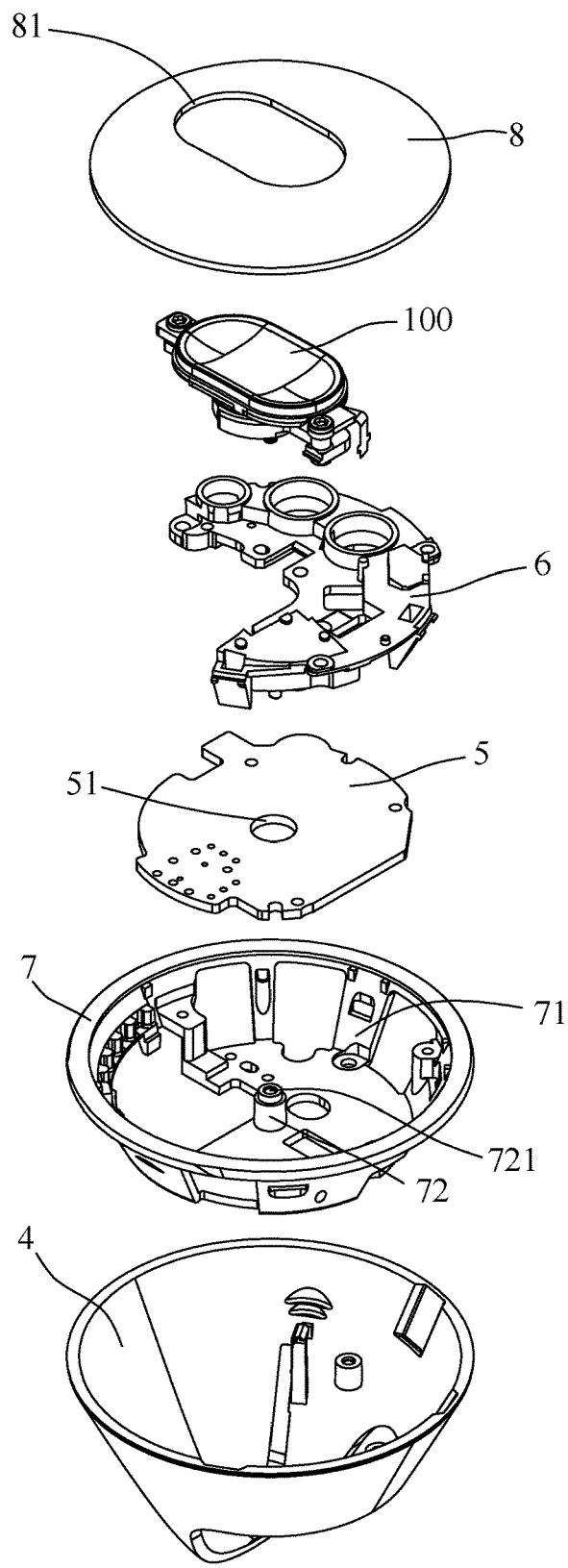
FIG. 5 is a cross-section view of the game controller along a line V-V of FIG. 4.
Figure 6:
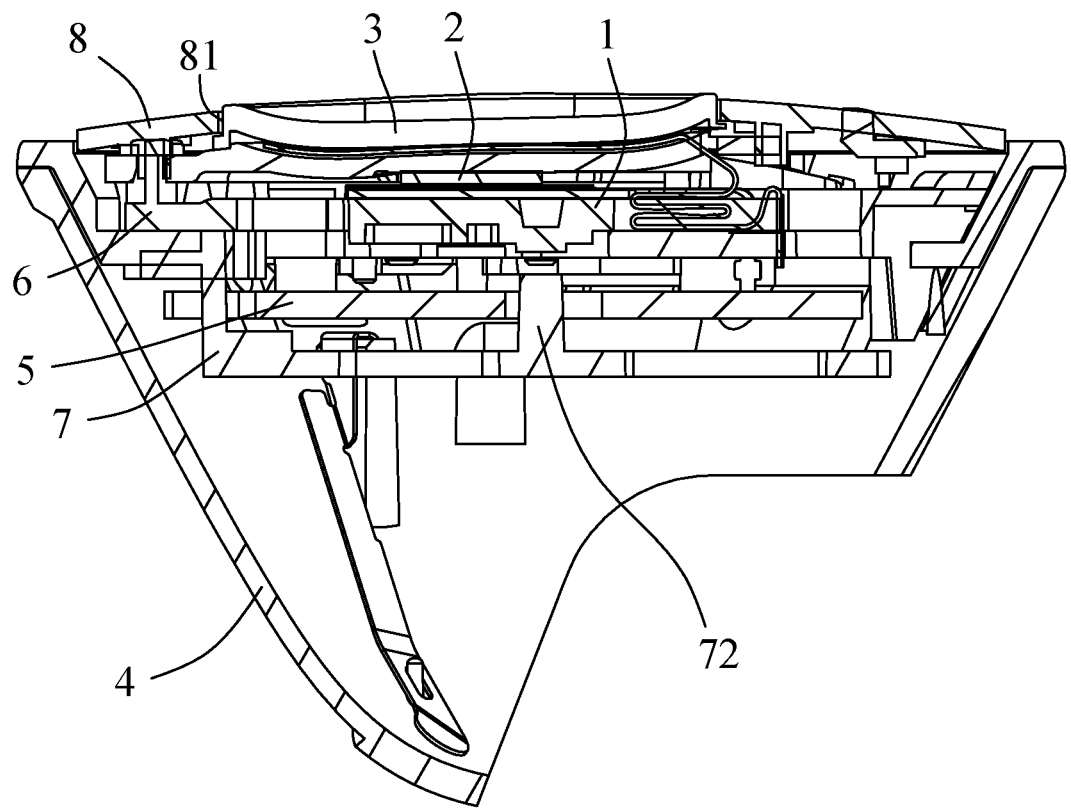
FIG. 6 is an exploded perspective view of the game controller equipped with the button assembly in accordance with the present invention.

With reference to FIG. 4 to FIG. 6, a button assembly 100 in accordance with the present invention is applied in the controller 200. The controller 200 includes an outer shell 4, a circuit board 5, a fastening frame 6, a casing 7 and a top cover 8.

The outer shell 4 is of a hollow circle shape. A top of the outer shell 4 is opened freely and communicated with an outside. The outer shell 4 has a first accommodated space 41 penetrating through a top of the outer shell 4 and communicated with the outside. The fastening frame 6 is mounted under the button assembly 100. The circuit board 5 is mounted under the fastening frame 6 and the button assembly 100. The circuit board 5 and the fastening frame 6 together with the button assembly 100 are disposed in the casing 7. The casing 7 is disposed in the first accommodating space 41 of the outer shell 4.

The casing 7 is of a hollow circle shape. A top of the casing 7 is opened freely and communicated with the top cover 8. The casing 7 has a second accommodating space 71 penetrating through a top of the casing. An inner surface of a bottom of the casing 7 protrudes upward to form a protruding pillar 72. A middle of a protruding pillar 72 is recessed downward to form a fastening groove 721 is corresponding to the fixing hole 16 of the base 1 of the button assembly 100.

The circuit board 5 is assembled in the second accommodating space 71 of the casing 7. The circuit board 5 has a connecting hole 51. A bottom surface of the circuit board 5 is equipped with a second capacitor (not shown). The fastening frame 6 is mounted on the circuit board 5 and is mounted in the casing 7. The top cover 8 is covered on the outer shell 4, and the top cover 8 covers the button assembly 100, the circuit board 5, the fastening frame 6 and the casing 7 which are mounted in the outer shell 4. A middle of the top cover 8 opens and elliptical opening 81 vertically penetrating through the top cover 7. The opening 71 is disposed corresponding to the button assembly 100. Specifically, the opening 71 is corresponding to the key cap 3.

The button assembly 100 is assembled in the controller 200. The fixing hole 16 and the middle of the fastening hole 13 of the pedestal 1 are corresponding to the fastening groove 721, the controller 200 further includes a fastening element 9. The fastening element 9 passes through and is fastened in the fastening hole 13, the fixing hole 161 and the fastening groove 721 of the protruding pillar 72 passing upward through the connecting hole 51. A tail end of the first capacitor 22 is connected with the second capacitor. The pedestal 1 is assembled on the casing 7, respectively.

The top cover 8 is covered on the outer shell 4. The top cover 8 covers the circuit board 5, the fastening frame 6 and the casing 7 which are mounted in the outer shell 4, and the button assembly 100. The key cap 3 is exposed outside from the opening 81. So the button assembly 100 is assembled in the game controller 200.

The pressure sensor module 2 and the key cap 3 of the button assembly 100 are assembled to form a combination module 10. The combination module 10 is mounted on the pedestal 1. The combination module 10 is capable of being assembled to other structures of which each is matched with the combination module 10, so the button assembly 100 in accordance with the present invention is without being limited to the above-mentioned detailed description disclosed in the preferred embodiment 24.

As described above, the button assembly 100 is capable of being pressed by virtue of the two limiting portions 12 and the active portion 32 and fixing portion 33 being disposed among the pedestal 1, the pressure sensor module 2 and the key cap 3, and furthermore, the pressure sensor module 2 and the key cap 3 of the button assembly 100 are assembled to form the combination module 10, the combination module 10 is mounted on the pedestal 1, so that the button assembly 100 reaches a modular requirement, the button assembly 100 applied in the controller 200 may be easily detected and changed in the other structures of which each is matched with the combination module 10. In addition, when the user presses the modular button assembly 100, a pressing force is transmitted to the pressure sensor module 2 through the key cap 3, comparing the modular button assembly 100 with a button assembly of the conventional controller, the modular button assembly 100 has fewer accumulated tolerances and a higher sensing sensitivity in use.

What is claimed is:

1. A button assembly adapted for being mounted in a game controller, comprising:
    a pedestal, a middle of the pedestal having an accommodating groove penetrating upward through a top surface of the middle of the pedestal, one side of the pedestal having a limiting portion, another side of the pedestal having another limiting portion, and the limiting portion and said another limiting portion oppositely protruding outward;
    a pressure sensor module mounted in the accommodating groove of the pedestal; and
    a key cap covering the pressure sensor module, a bottom surface of the key cap having a contact portion contacting with the pressure sensor module, one side of the key cap having an active portion protruded outward, and an opposite side of the key cap having a fixing portion protruded outward, the active portion and the fixing portion being mounted to the limiting portion and said another limiting portion, respectively, in processes of pressing and releasing the key cap, the active portion and the fixing portion moving downward and upward with respect to one of the limiting portion and said another limiting portion;

wherein the pedestal has a base portion, each of the limiting portion and said another limiting portion has a lower extending portion extending outward from one side of the base portion, tail ends of the lower extending portion of the limiting portion protrude upward to form a first protruding block, the active portion is movably inserted downward into the first protruding block, tail ends of the lower extending portion of said another limiting portion protrudes upward to form a second protruding block, and the fixing portion is fixed to the second protruding block; and the key cap has a main portion, the active portion has an active hole, the first protruding block passes through the active hole, a top surface of the fixing portion has an upper fixing hole, the upper fixing hole corresponds to a second fixing hole of said another limiting portion.

2. The button assembly as claimed in claim 1, wherein a top of the pressure sensor module has a soft material sensor, when the key cap is pressed, the soft material sensor shows a sunken status, the first protruding block passes through the active hole and the action portion moves downward along the first protruding block, when the key cap is released, the soft material sensor which shows the sunken status will rebound upward to return to an original status so as to push upward the contact portion and make the active portion move upward along the first protruding block, and then the key cap is returned to an initial status.

3. The button assembly as claimed in claim 1, wherein a peripheral surface of the base portion of the pedestal has a plurality of limiting blocks, so that the accommodating groove is surrounded by the plurality of limiting blocks.

4. The button assembly as claimed in claim 1, wherein the pressure sensor module has a fastening portion, and includes a soft material sensor mounted on a top of the fastening portion, the contact portion contacts with a top surface of the soft material sensor.

5. The button assembly as claimed in claim 4, wherein the soft material sensor has an elasticity.

6. A controller, comprising:
a button assembly, including:
a pedestal, a middle of the pedestal having an accommodating groove penetrating upward through a top surface of the middle of the pedestal, one side of the pedestal having a limiting portion, another side of the pedestal having another limiting portion, and the limiting portion and said another limiting portion oppositely protruding outward;
a pressure sensor module mounted in the accommodating groove of the pedestal; and
a key cap covering the pressure sensor module, a bottom surface of the key cap having a contact portion contacting with the pressure sensor module, one side of the key cap having an active portion protruded outward, and an opposite side of the key cap having a fixing portion protruded outward, the active portion and the fixing portion being mounted to the limiting portion and said another limiting portion, respectively, in processes of pressing and releasing the key cap, the active portion and the fixing portion moving downward and upward to one of the limiting portion and said another limiting portion;
a casing mounted under the button assembly;
a fastening frame mounted in the casing;
a circuit board mounted under the fastening frame and the button assembly and mounted in the casing;
an outer shell, the casing, the circuit board and the fastening frame together with the button assembly being disposed in the outer shell; and
a top cover covering the outer shell, the top cover covering the button assembly, the casing, the circuit board and the fastening frame, a middle of the top cover having an opening vertically penetrating through the top cover, and the key cap being exposed outside from the opening;
wherein the pedestal has a base portion, each of the limiting portion and said another limiting portion has a lower extending portion extending outward from one side of the base portion, tail ends of one of the lower extending portions of the limiting portion and said another limiting portion protrude upward to form a first protruding block, and the active portion is movably inserted downward into the first protruding block; and the key cap has a main portion, the active portion has an active hole, the first protruding block passes through the active hole, a top surface of the fixing portion has an upper fixing hole, the upper fixing hole corresponds to a second fixing hole of said another limiting portion.

7. The controller as claimed in claim 6, wherein a top of the pressure sensor module has a soft material sensor, when the key cap is pressed, the soft material sensor shows a sunken status, the first protruding block passes through the active hole and the active portion moves downward along the first protruding block, when the key cap is released, the soft material sensor which shows the sunken status will rebound upward to return to an original status so as to push upward the contact portion and make the active portion move upward along the first protruding block, and then the key cap is returned to an initial status.

8. The controller as claimed in claim 6, wherein the casing is of a hollow circle shape, a top of the casing is opened freely and communicated with the top cover, the casing has a second accommodating space penetrating through a top of the casing, an inner surface of a bottom of the casing protrudes upward to form a protruding pillar a middle of the protruding pillar is recessed downward to form a fastening groove corresponding to a fixing hole of a base of the button assembly.

9. The controller as claimed in claim 6, wherein a peripheral surface of the base portion of the pedestal has a plurality of limiting blocks, so that the accommodating groove is surrounded by the plurality of limiting blocks.

10. The controller as claimed in claim 6, further comprising a fastening element, the base portion having a fastening hole vertically penetrating through the base portion, an inner surface of a bottom of the outer shell protruding upward to form a protruding pillar, a middle of a top surface of the protruding pillar being recessed downward to form a fastening groove, a bottom of the base portion protruding downward to form a hollow fixing pillar of which a middle has a fixing hole corresponding to a middle of the fastening hole, the circuit board having a connecting hole, the fastening frame having a locating hole corresponding to and communicated with the connecting hole, the protruding pillar passing upward through the connecting hole and the locating hole, the fastening element passing through and being fastened in the fastening hole, the fixing hole and the fastening groove.

11. The controller as claimed in claim 6, wherein the pressure sensor module has a fastening portion, and includes a soft material sensor mounted on a top of the fastening portion, the contact portion contacts with a top surface of the soft material sensor.

12. The controller as claimed in claim 11, wherein the soft material sensor has an elasticity.

13. The controller as claimed in claim 6, wherein the pressure sensor module has a fastening portion, and a first capacitor extended outward from one side of the fastening portion, a bottom surface of the circuit board is equipped with a second capacitor, a tail end of the first capacitor is connected with the second capacitor.

14. A button assembly adapted for being mounted in a controller, comprising:
a pedestal, one side of the pedestal having a limiting portion, another side of the pedestal having another limiting portion, and the limiting portion and said another limiting portion oppositely protruding outward;
a pressure sensor module mounted in the pedestal, a top of the pressure sensor module having a soft material sensor, the soft material sensor having an elasticity; and
a key cap covering the pressure sensor module, a bottom surface of the key cap having a contact portion contacting with the pressure sensor module, one side of the key cap having an active portion protruded outward, and an opposite side of the key cap having a fixing portion protruded outward, the active portion and the fixing portion being mounted to the limiting portion and said another limiting portion, respectively, in processes of pressing and releasing the key cap, the active portion and the fixing portion moving downward and upward to one of the limiting portion and said another limiting portion;
wherein the pressure sensor module has a fastening portion, and a first capacitor extends outward from one side of the fastening portion, a bottom surface of the circuit board is equipped with a second capacitor, a tail end of the first capacitor is connected with the second capacitor.

15. The button assembly as claimed in claim 14, wherein the pedestal has a base portion, two opposite sides of a peripheral surface of the base portion protrude outward and then extend upward to form two limiting blocks, a middle of the pedestal has an accommodating groove surrounded by the two limiting blocks, and the pressure sensor module is mounted in the accommodating groove.

* * * * *